(12) United States Patent
Li et al.

(10) Patent No.: US 8,322,745 B2
(45) Date of Patent: Dec. 4, 2012

(54) TANDEM STROLLER FRAME

(75) Inventors: Jian-Qun Li, Taipei (TW); Shun-Min Chen, Taipei (TW); Li Dao-Chang, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 315 days.

(21) Appl. No.: 12/773,343

(22) Filed: May 4, 2010

(65) Prior Publication Data

US 2010/0282800 A1 Nov. 11, 2010

(30) Foreign Application Priority Data

May 5, 2009 (CN) .......................... 2009 1 0138122

(51) Int. Cl.
*B62B 1/00* (2006.01)

(52) U.S. Cl. .................... 280/642; 280/47.4; 280/647

(58) Field of Classification Search ............... 280/47.38, 280/47.4, 642, 647, 648, 650, 657, 658
See application file for complete search history.

(56) References Cited

U.S. PATENT DOCUMENTS

| 5,664,795 | A | | 9/1997 | Haung | |
|---|---|---|---|---|---|
| 5,911,432 | A | * | 6/1999 | Song | 280/643 |
| 6,086,087 | A | | 7/2000 | Yang | |
| 6,530,591 | B2 | | 3/2003 | Huang | |
| 6,935,652 | B2 | * | 8/2005 | Fair et al. | 280/642 |
| 6,979,017 | B2 | * | 12/2005 | Chen | 280/642 |
| 2010/0109292 | A1 | * | 5/2010 | Chen et al. | 280/642 |

\* cited by examiner

*Primary Examiner* — John Walters
(74) *Attorney, Agent, or Firm* — Dickstein Shapiro LLP

(57) ABSTRACT

A tandem stroller frame includes two lateral frame units, a handle unit, two side rod units, and a footrest plate. Each lateral frame unit includes front and leg rods connected pivotally to each other. The handle unit includes two side handle rods connected pivotally and respectively to the lateral frame units. Each side rod unit is disposed between the front leg rod of a respective one of the lateral frame units and a corresponding one of the side handle rods, and includes a front leg connecting portion connected pivotally to the front leg rod of the respective lateral frame unit, and a rear connecting portion connected pivotally to one of the corresponding side handle rod and the rear leg rod of the respective lateral frame unit. The footrest plate interconnects the rear leg rods of the lateral frame units.

19 Claims, 13 Drawing Sheets

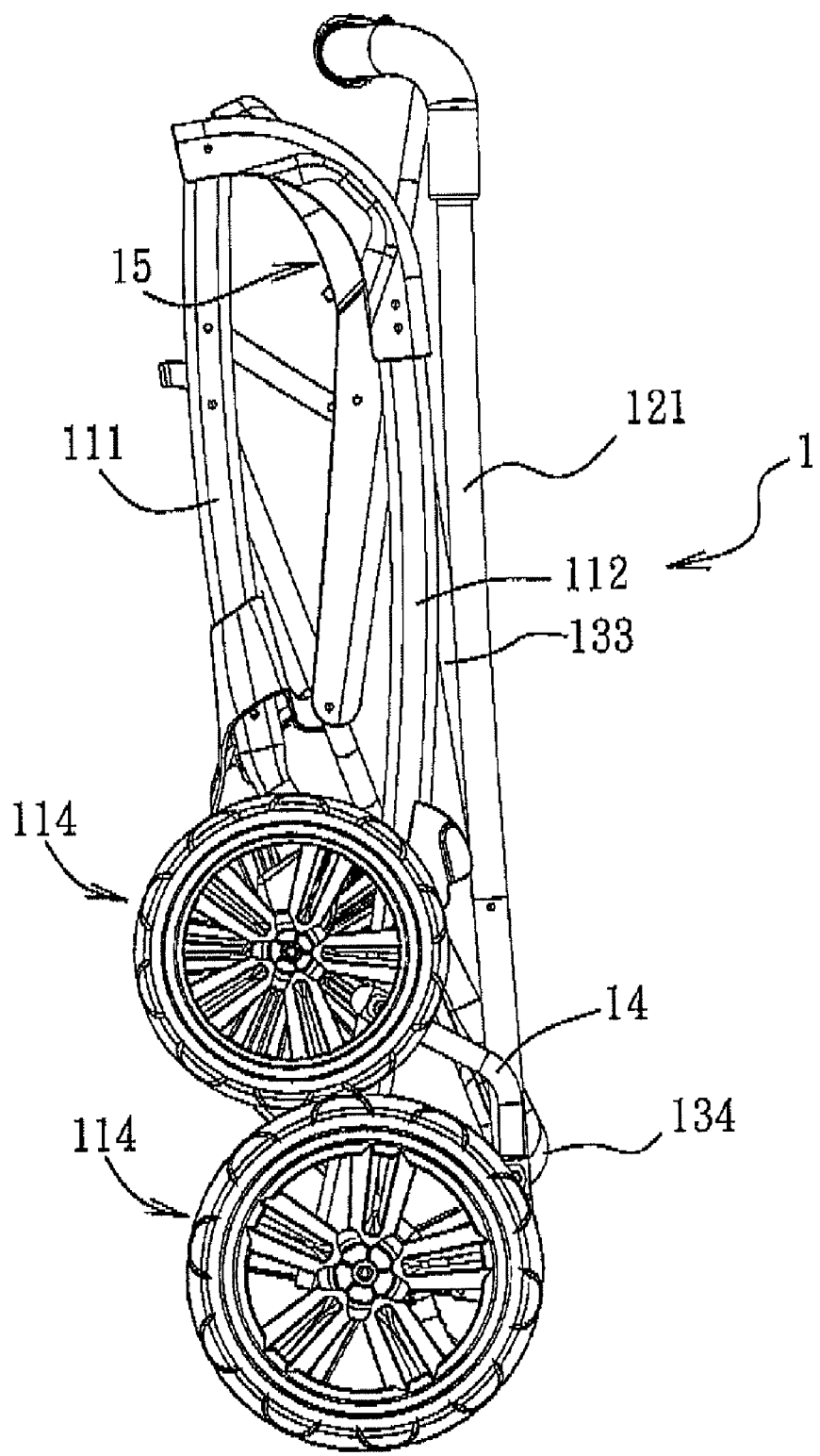
F I G. 5

TANDEM STROLLER FRAME

CROSS-REFERENCE TO RELATED APPLICATION

This application claims priority of Chinese Application No. 200910138122.6, filed on May 5, 2009.

BACKGROUND OF THE INVENTION

1. Field of the Invention

The invention relates to a stroller frame, more particularly to a foldable tandem stroller frame.

2. Description of the Related Art

U.S. Pat. No. 6,530,591 and U.S. Pat. No. 5,664,795 disclose conventional tandem strollers for transporting two children thereon. However, these conventional tandem strollers cannot be folded when not in use, so that it is inconvenient to store and transport these conventional tandem strollers.

U.S. Pat. No. 6,086,087 discloses another conventional tandem stroller for transporting two children thereon. In use, one of the children is sitting in a front seat of this conventional tandem stroller, and the other one of the children can sit on or stand at a rear side of the conventional tandem stroller. In addition, this conventional tandem stroller can be folded after use to facilitate storage and transport thereof. However, this conventional tandem stroller has a relatively complicated stroller frame so that the volume of the conventional tandem stroller is relatively large and not easy to transport.

SUMMARY OF THE INVENTION

Therefore, the object of the present invention is to provide a tandem stroller frame that is foldable and that has a relatively simple structure and a relatively compact size after being folded.

Accordingly, a tandem stroller frame of the present invention comprises a pair of spaced-apart lateral frame units, a handle unit, a pair of rod units, and a footrest plate. Each of the lateral frame units includes a front leg rod, and a rear leg rod connected pivotally to the front leg rod. The handle unit includes a pair of side handle rods connected pivotally and respectively to the lateral frame units. Each of the side rod units is disposed between the front leg rod of a respective one of the lateral frame units and a corresponding one of the side handle rods of the handle unit. Each of the side rod units includes a front leg connecting portion connected pivotally to the front leg rod of the respective one of the lateral frame units, and a rear connecting portion connected pivotally to one of the corresponding one of the side handle rods and the rear leg rod of the respective one of the lateral frame units. The front leg connecting portions of the side rod units are adapted for supporting cooperatively a front seat thereon, and the rear connecting portions of the side rod units are adapted for supporting cooperatively a rear seat thereon. The footrest plate interconnects the rear leg rods of the lateral frame units and is adapted to be disposed below the rear seat.

BRIEF DESCRIPTION OF THE DRAWINGS

Other features and advantages of the present invention will become apparent in the following detailed description of the preferred embodiments with reference to the accompanying drawings, of which:

FIG. 5 is another side view of the first preferred embodiment in a folded state;

DETAILED DESCRIPTION OF THE PREFERRED EMBODIMENTS

Figure 1:
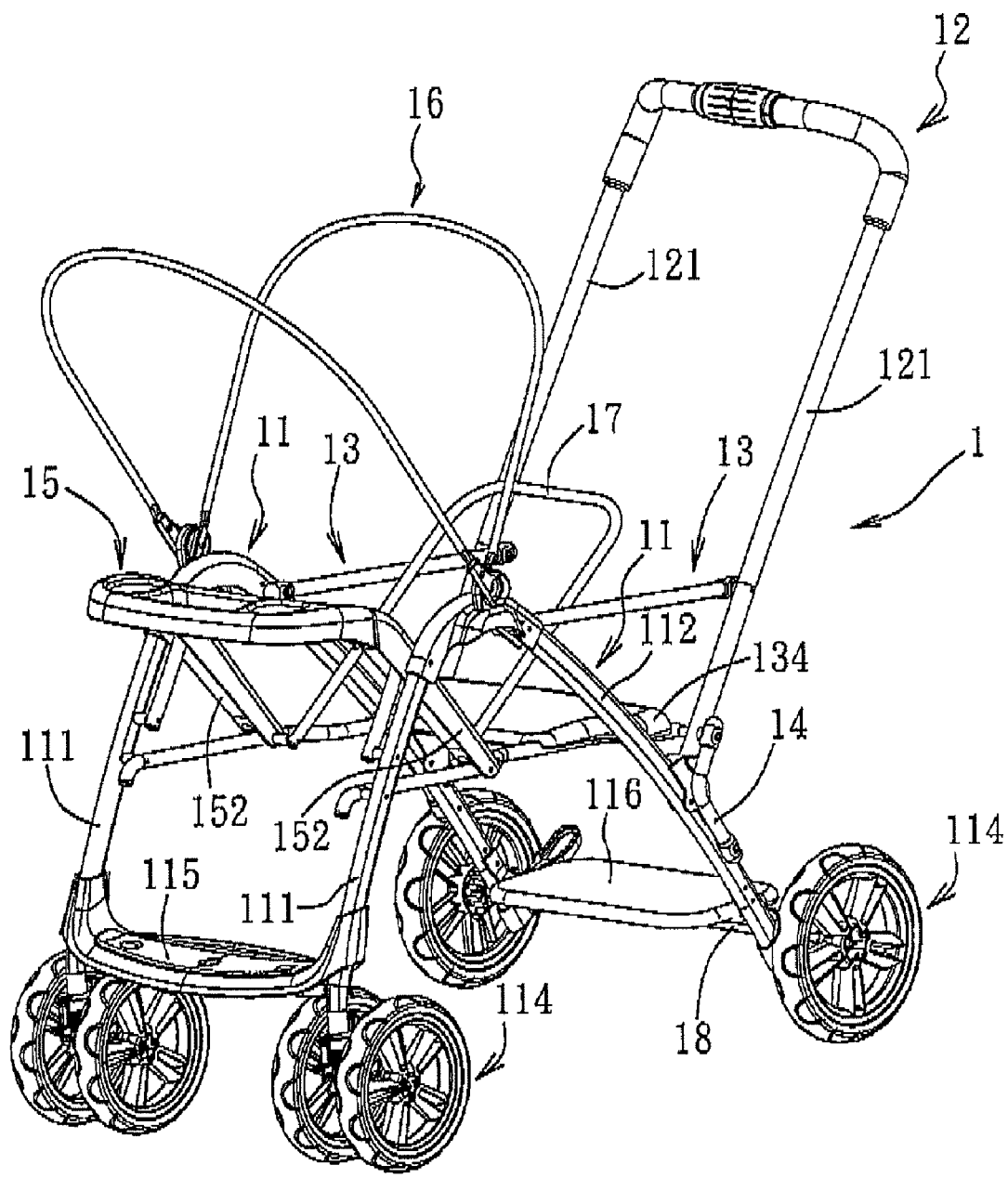
FIG. 1 is a perspective view showing a first preferred embodiment of a tandem stroller frame according to the invention in an unfolded state.

Before the present invention is described in greater detail, it should be noted that like elements are denoted by the same reference numerals throughout the disclosure.

Figure 2:
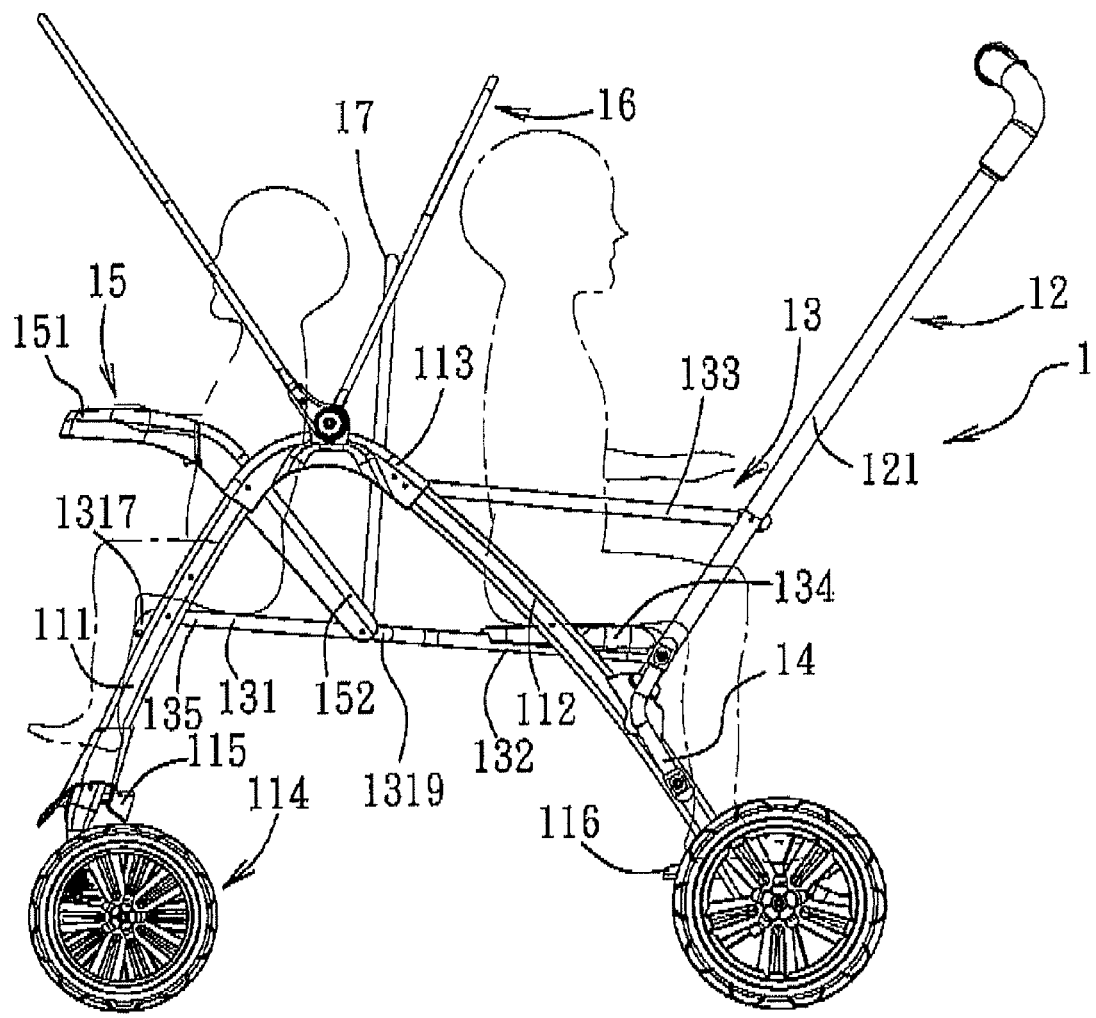
FIG. 2 is a side view of the first preferred embodiment in the unfolded state.

As shown in FIGS. 1 and 2, the first preferred embodiment of a tandem stroller frame 1 according to the present invention comprises a pair of spaced-apart lateral frame units 11, a handle unit 12, and a pair of side rod units 13.

Each of the lateral frame units 11 includes a front leg rod 111, a rear leg rod 112, a pivot seat 113 interconnecting pivotally top ends of the front and rear leg rods 111, 112, and a pair of wheel units 114 connected rotatably and respectively to bottom ends of the front and rear leg rods 111, 112. In this embodiment, the pivot seat 113 is formed as a curved rod, and has opposite ends connected respectively and pivotally to the front and rear leg rods 111, 112. The tandem stroller frame further comprises a front footrest plate 115 interconnecting the front leg rods 111 of the lateral frame units 11 and disposed adjacent to the bottom ends of the front leg rods 111, and a rear footrest plate 116 disposed between the rear leg rods 112 of the lateral frame units 11 and disposed adjacent to the bottom ends of the rear leg rods 112.

In this embodiment, the handle unit 12 is generally inverted U-shaped, and includes a pair of side handle rods 121 that are parallel to each other, and a pair of connecting members 14. Each of the connecting members 14 has an end connected pivotally to a bottom part of a respective one of the handle rods 121, and an opposite end connected pivotally to a corresponding one of the rear leg rods 112 (i.e., the side handle rods 121 are connected pivotally and respectively to the rear leg rods 112 of the lateral frame units 11 by virtue of the connecting members 14).

Each of the side rod units 13 is disposed between the front leg rod 111 of a respective one of the lateral frame units 11 and a corresponding one of the side handle rods 121 of the handle unit 12, and includes a front seat supporting rod 131, a rear seat supporting rod 132, and an armrest 133. In this embodiment, the front seat supporting rod 131 has a front end portion 1317 configured as a front leg connecting portion that is connected pivotally to the front leg rod 111 of the respective one of the lateral frame units 11, and a rear end portion 1319 opposite to the front end portion 1317. The rear seat supporting rod 132 has a front end portion connected to the front seat supporting rod 131, and a rear end portion configured as a rear connecting portion that is connected pivotally to the corresponding one of the side handle rods 121 at a position above the rear footrest plate 116 (i.e., the rear footrest plate 116 is disposed below the rear seat supporting rods 132 of the side rod units 13). In this embodiment, the front and rear seat supporting rods 131, 132 are formed integrally with each other. Also, in this embodiment, the armrest 133 is disposed above the rear seat supporting rod 132, and has a front end connected pivotally to the pivot seat 113 of a corresponding one of the lateral frame units 11, and a rear end opposite to the front end and connected pivotally to the corresponding one of the side handle rods 121. The front seat supporting rods 131 of the side rod units 13 are adapted for supporting cooperatively a front seat 135 above the front footrest plate 115. The rear seat supporting rods 132 of the side rod units 13 are adapted for supporting cooperatively a rear seat 134 above the rear footrest plate 116.

In this embodiment, the tandem stroller frame 1 further comprises a transverse rod 18 having opposite ends connected respectively to the rear leg rods 112 of the lateral frame units 11, and the rear footrest plate 116 is mounted on the transverse rod 18 (i.e., the rear footrest plate 116 is connected to the rear leg rods 112 by virtue of the transverse rod 18). It should be noted that, in other embodiments of this invention, each of the opposite ends of the rear footrest plate 116 may be configured to have opposite ends formed respectively with a pair of sleeve structures that are sleeved respectively on the rear leg rods 112 of the lateral frame units 11, and the rear footrest plate 116 is mounted on and supported by the transverse rod 18.

In this embodiment, the tandem stroller frame 1 further comprises a tray unit 15, a covering supporting member 16, and a backrest supporting member 17. The tray unit 15 includes a tray body 151 disposed above the front seat supporting rods 131 of the side rod units 13, and a pair of support arms 152 extending respectively from lateral sides of the tray body 151 and connected pivotally and respectively to the front seat supporting rods 131 of the side rod units 13. The covering supporting member 16 is generally inverted U-shaped and has opposite ends connected pivotally and respectively to the pivot seats 113 of the lateral frame units 11. The backrest supporting member 17 is generally inverted U-shaped and has opposite ends connected pivotally and respectively to the front seat supporting rods 131 of the side rod units 13. The tandem stroller frame 1 is adapted to be covered by a covering (not shown) that is made from textile or other flexible material. The front seat 135 is also formed from textile or other flexible material.

In use, the tandem stroller frame 1 is in an unfolded state (see FIGS. 1 and 2). At this time, for each of the side rod units 13 and the corresponding one of the lateral frame units 11, the front seat supporting rod 131 and the rear seat supporting rod 132 are formed as a horizontally-extending elongated rod, the armrest 133 extends parallel to the front and rear seat supporting rods 131, 132, and the bottom end of the front leg rod 111 is far from that of the rear leg rod 112. When the tandem stroller frame 1 is at the unfolded state, the side handle rods 121 is locked relative to the rear leg rods 112 of the lateral frame units 11 at positions where top ends of the side handle rods 121 are far from the rear leg rods 112 of the lateral frame units 11. Therefore, a child can be seated on the front seat 135 with his feet rested on the front footrest plate 115, while another child can be seated on the rear seat 134 with his feet rested on the rear footrest plate 116. Alternatively, the child at the rear side can stand on the rear footrest plate 116 with his hands gripping respectively the armrests 133 of the side rod units 13 or the side handle rods 121 (see FIG. 3).

Figure 3:
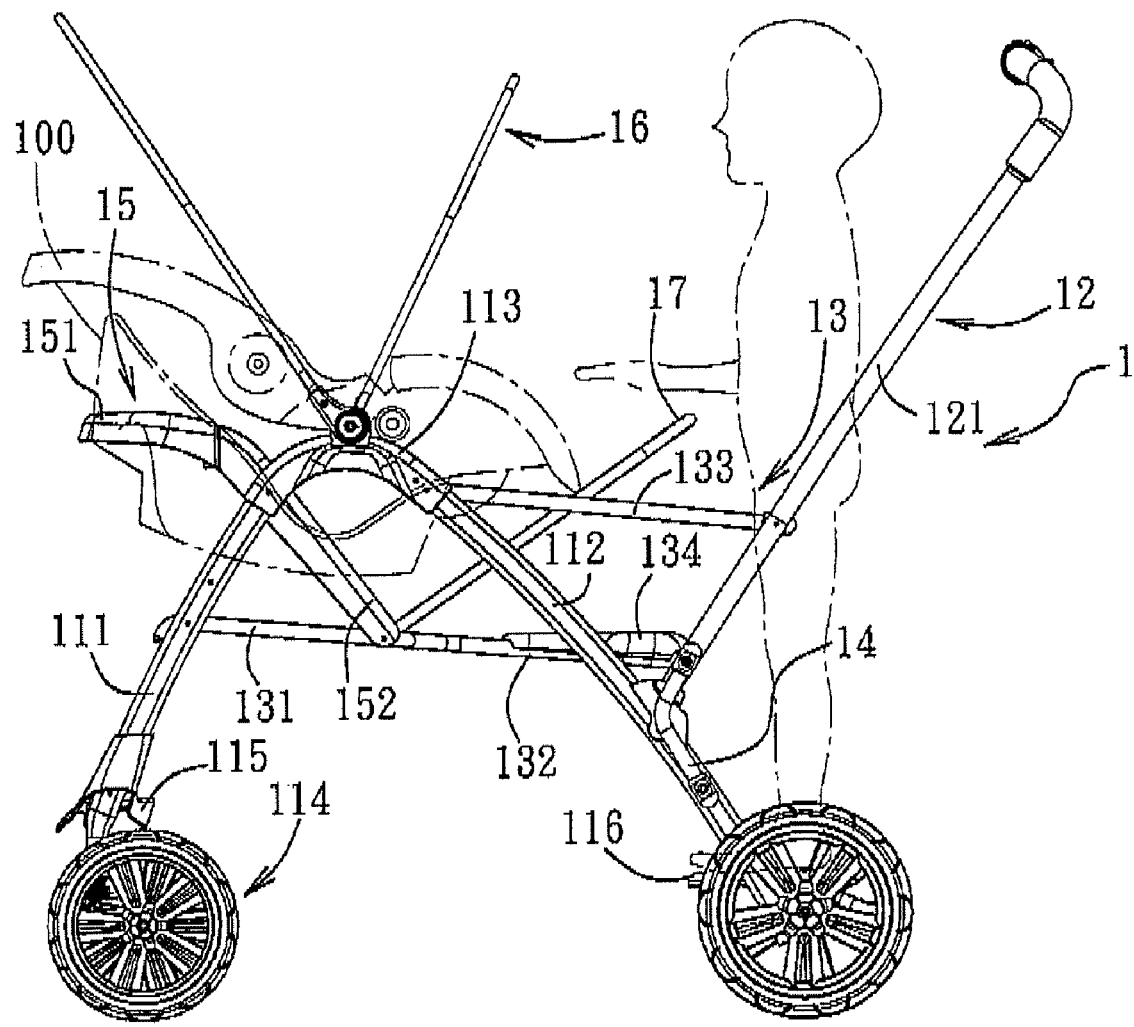
FIG. 3 is another side view of the first preferred embodiment, illustrating how an infant seat is supported thereon.

As shown in FIG. 3, when in the unfolded state, the tandem stroller frame 1 of this invention can also be configured to support an infant seat 100 for car thereon. The infant seat 100 can be placed between the lateral frame units 11 with a bottom end of its front portion supported by the tray unit 15 and its opposite lateral portions engaging respectively the pivot seats 113 of the lateral frame unit 11. A safety belt (not shown) disposed at the front seat 135 is extended around the infant seat 100 and can be fastened so as to secure the infant seat 100 on the tandem stroller frame 1 of this invention. Meanwhile, a child can stand on the rear footrest plate 116 in the above-mentioned manner.

Figure 4:
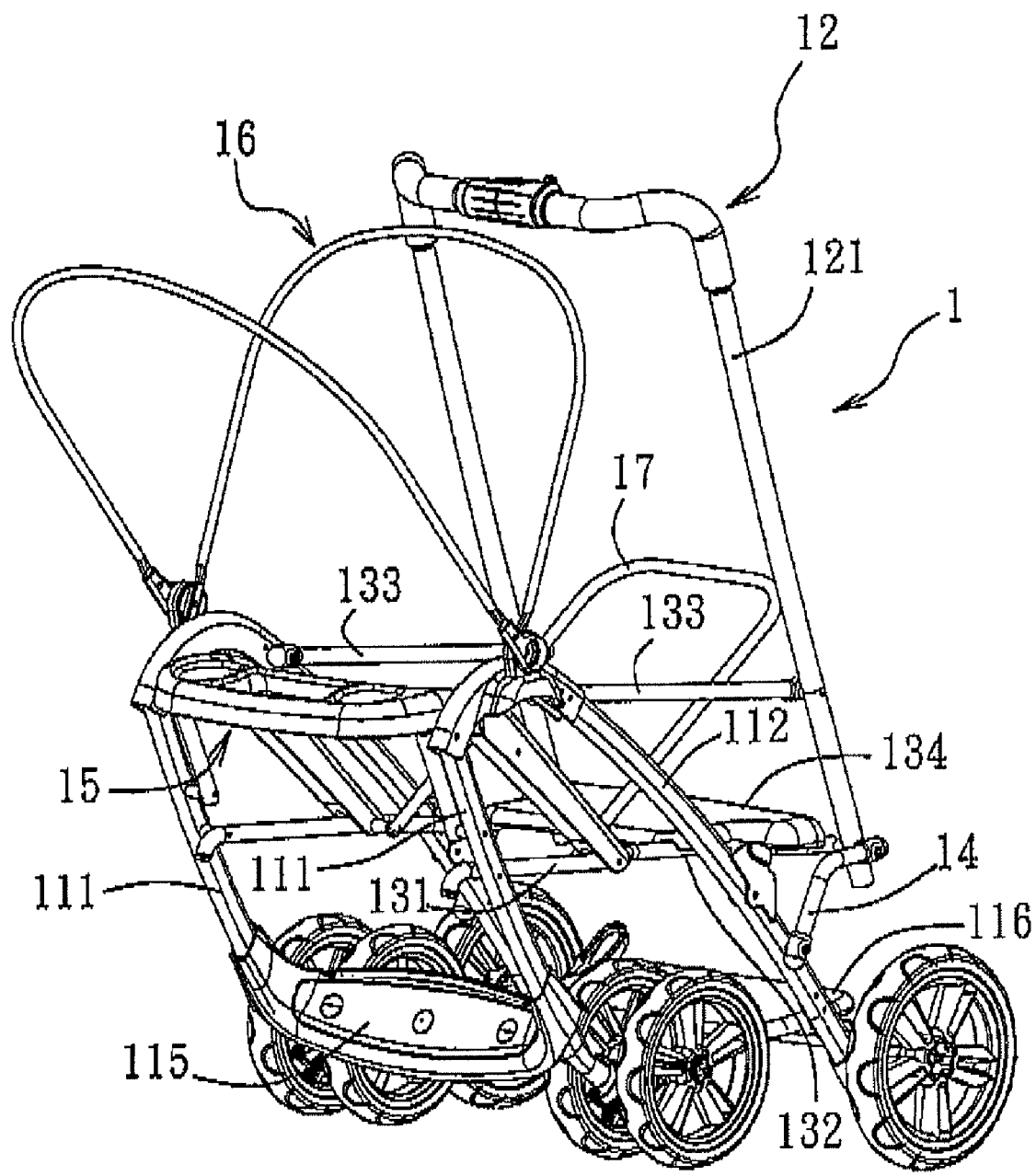
FIG. 4 is another perspective view of the first preferred embodiment in a semi-folded state.

To fold the tandem stroller frame 1 of this invention after use, referring to FIGS. 4 and 5, the side handle rods 121 are unlocked relative to the rear leg rods 112 and pushed to pivot respectively toward the rear leg rods 112 of the lateral frame units 11, and the front leg rods 111 of the lateral frame units 11 are consequently and respectively pivoted toward the rear leg rods 112 of the lateral frame units 11. During the pivoting action of the front leg rods 111 toward the rear leg rods 112, the wheel units 114 connected to the bottom ends of the front leg rods 111 are lifted from the ground. In detail, since the side handle rods 121 are connected pivotally and respectively to the rear leg rods 112 of the lateral frame units 11 by virtue of the connecting members 14, the side handle rods 121 are pushed to drive pivoting movement of the side handle rods 121 relative to the connecting members 14 as well as pivoting movement of the rear leg rods 112 relative to the connecting members 19, and the side handle rods 121 move downwardly together with the rear seat supporting rods 132 of the side rod units 13 during the pivoting movement of the side handle rods 121 relative to the rear leg rods 112. Moreover, during the folding process, for each of the side rod units 13, the elongated rods formed from the front and rear seat supporting rods 131, 132 are rotated in a rotational direction such that a rear end of the rear seat supporting rod 132 is moved downwardly. Finally, the tandem stroller frame 1 of this invention is changed to a folded state (see FIG. 5) where the wheel units 114 connected to the bottom ends of the front leg rods 111 are moved to positions above the other wheel units 114 connected to the bottom ends of the rear leg rods 112, respectively, and the tray unit 15 is moved to a position over the rear seat 134.

Figure 6:
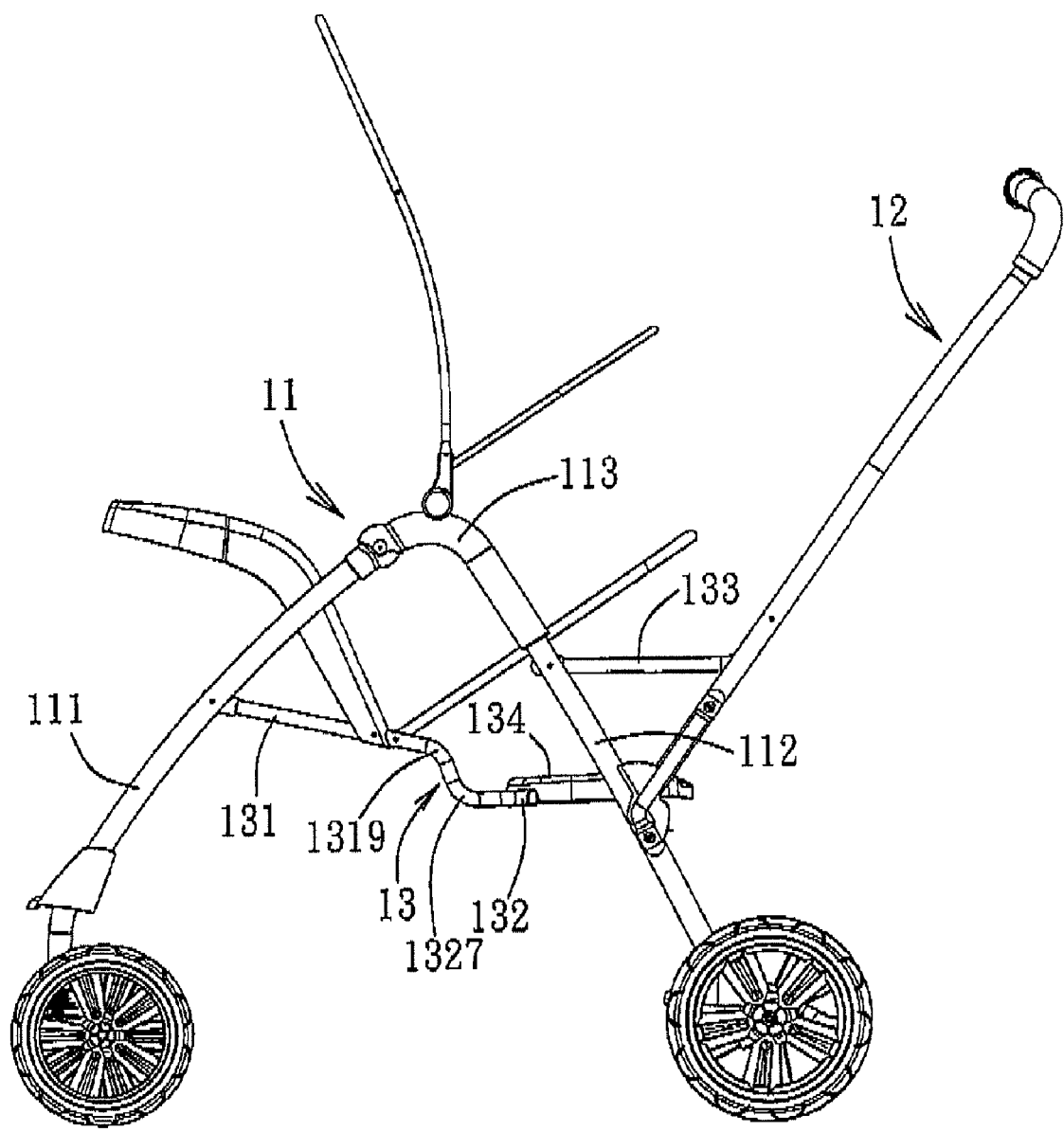
FIG. 6 is another side view of the first preferred embodiment with modified side rod units.

It should be noted that, referring to FIG. 6, the side rod units 13 may be configured such that the front end of the armrest 133 of each of the side rod units 13 is connected pivotally to the rear leg rod 112 of the respective one of the lateral frame units 11. Furthermore, the front seat supporting rod 131 of each of the side rod units 13 may be modified to have the rear end portion 1319 bent downwardly, and the rear seat supporting rod 132 of each of the side rod units 13 may be modified to have a front end portion 1327 bent upwardly, such that the front seat supporting rod 131 of each of the side rod units 13 and the rear seat supporting rod 132 of the corresponding one of the side rod units 13 are formed integrally as an S-shaped rod.

Figure 7:
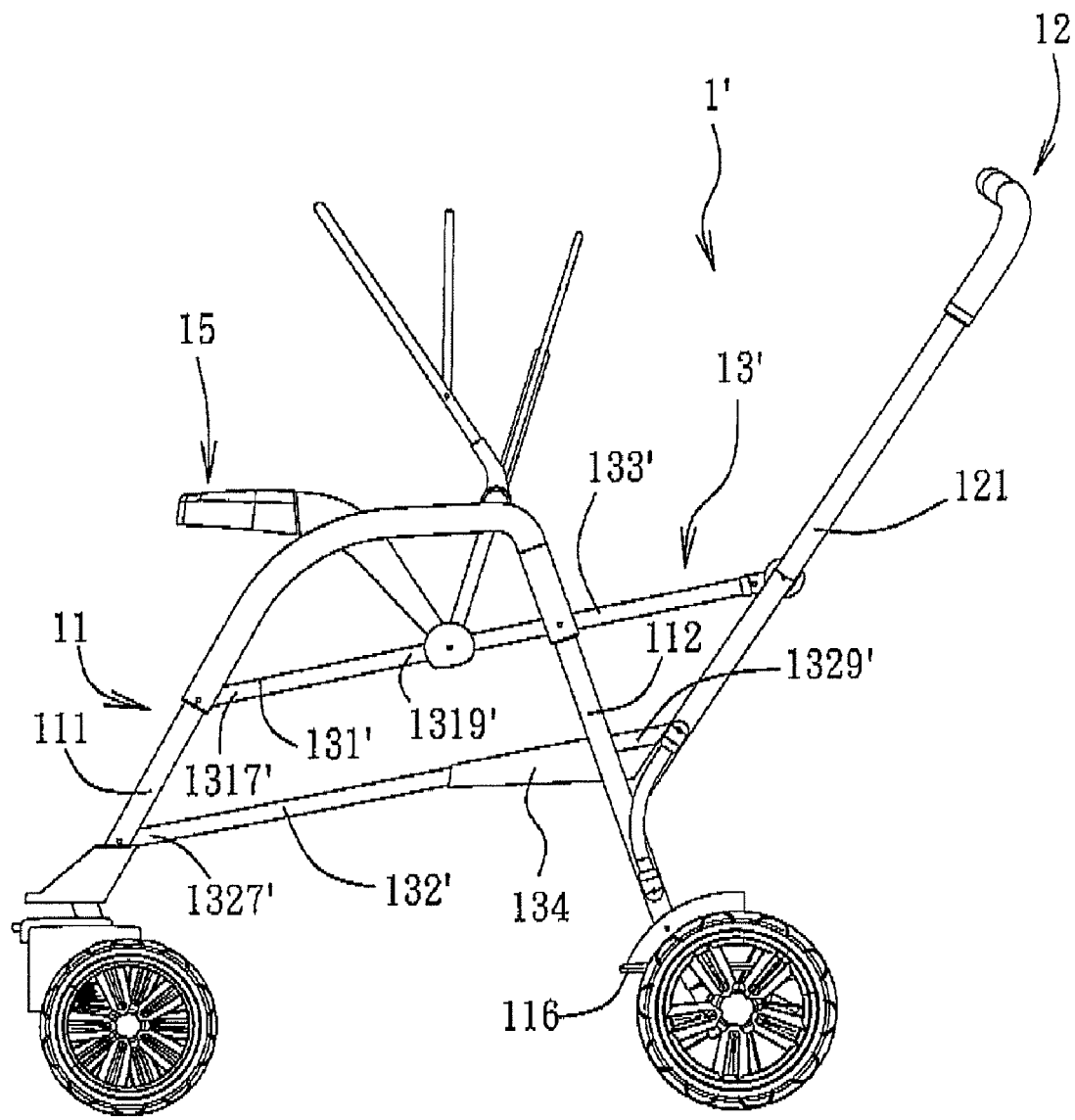
FIG. 7 is a side view of a second preferred embodiment of the tandem stroller frame according to the invention.
Figure 8:
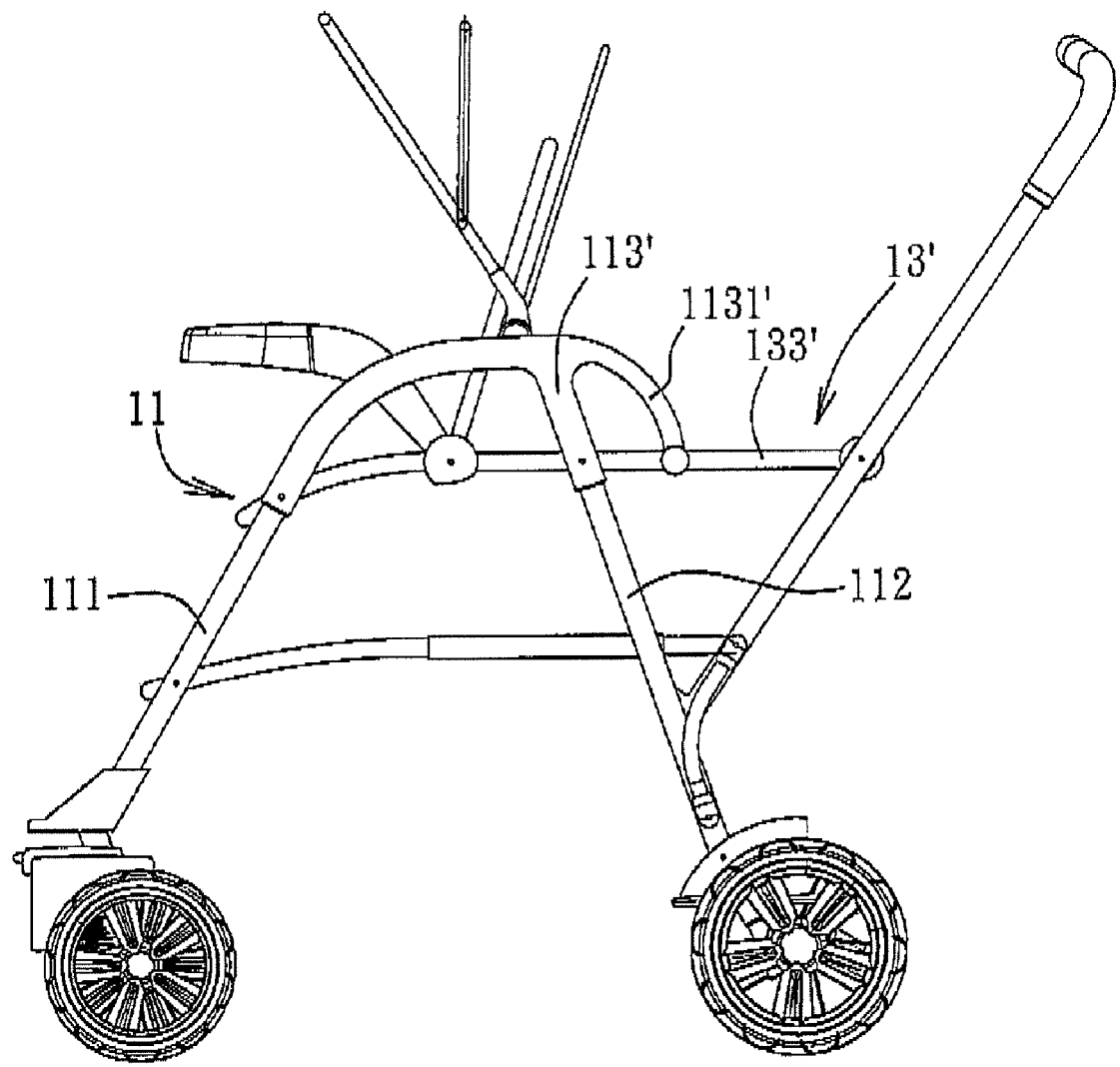
FIG. 8 is a side view of the second preferred embodiment with modified pivot seats.
Figure 9:
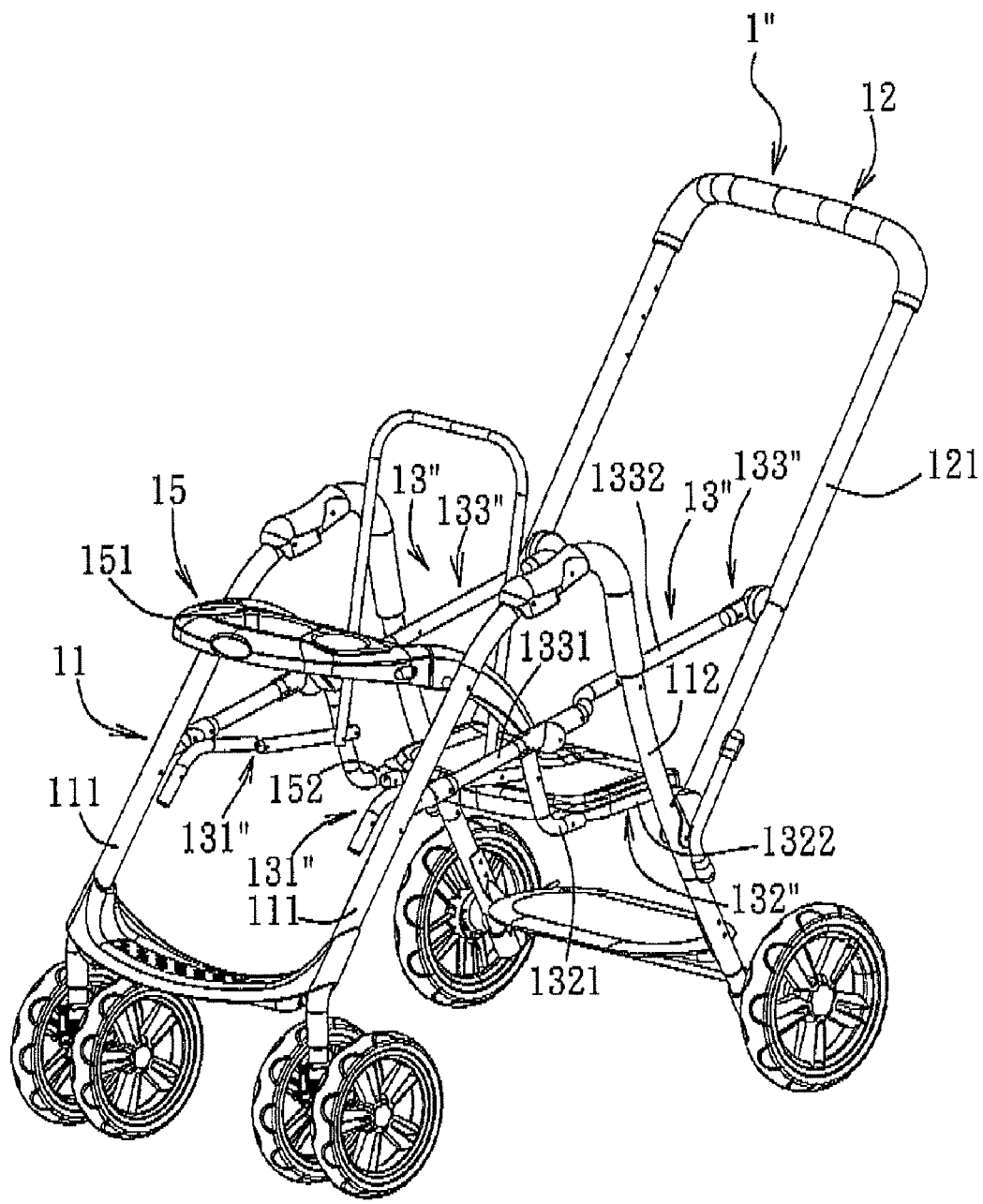
FIG. 9 is a perspective view of a third preferred embodiment of the tandem stroller frame according to the invention.
Figure 10:
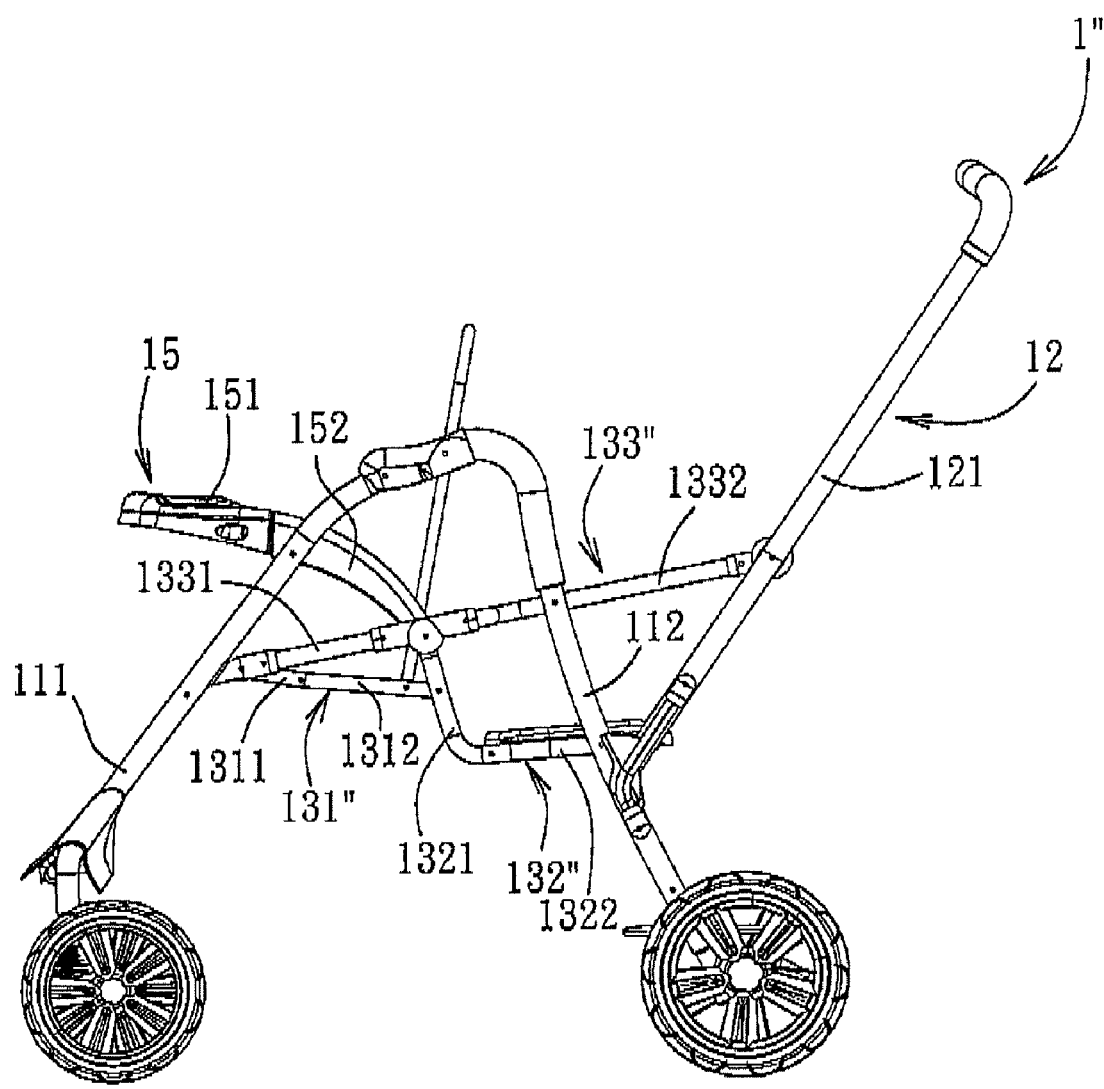
FIG. 10 is a side view of the third preferred embodiment in an unfolded state.
Figure 11:
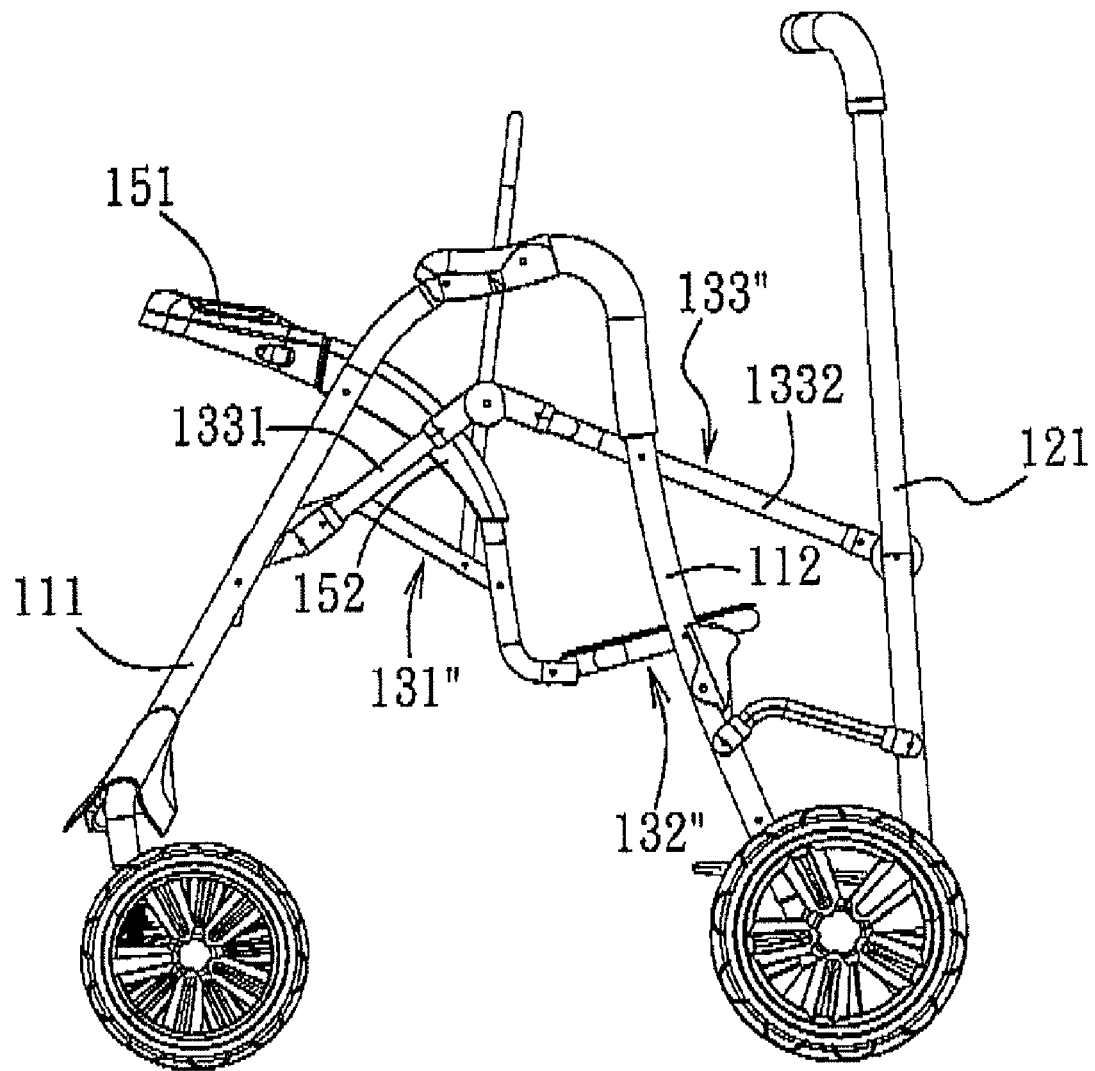
FIG. 11 is another side view of the third preferred embodiment in a semi-folded state.
Figure 12:
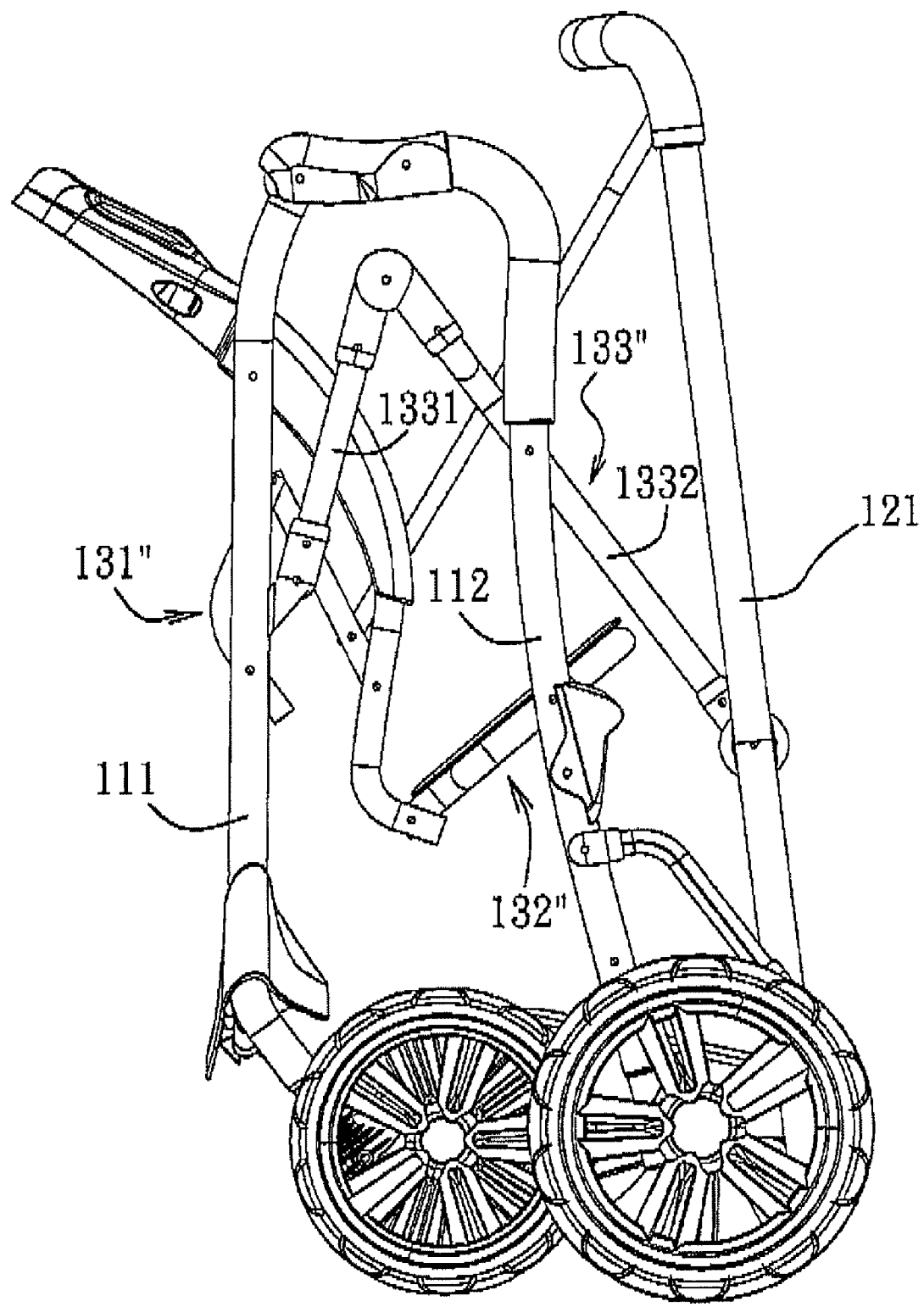
FIG. 12 is another side view of the third preferred embodiment in a folded state.

As shown in FIG. 7, the second preferred embodiment of the tandem stroller frame 1' according to the present invention has a structure similar to that of the first embodiment. The main difference between this embodiment and the previous embodiment resides in the configuration of the side rod units 13'. In this embodiment, for each of the side rod units 13', the front seat supporting rod 131' and the armrest 133' are formed integrally with each other. The front seat supporting rod 131' has a front end portion 1317' configured as the front leg connecting portion that is connected pivotally to the front leg rod 111 of the respective one of the lateral frame units 11, and a rear end portion 1319' opposite to the front end portion 1317' and connected to a front end of the armrest 133' of a corresponding one of the side rod units 13'. The rear seat supporting rod 132' is disposed below the front seat supporting rod 131' and the armrest 133', and has a front end portion 1327' connected pivotally to the front leg rod 111 of the respective one of the lateral frame units 11, and a rear end portion 1329' configured as the rear connecting portion that is connected pivotally to the corresponding one of the side handle rods 121 of the handle unit 12. The second preferred embodiment has the same advantages as those of the first preferred embodiment. It should be further noted that, referring to FIG. 8, the pivot seat 113' of each of the lateral frame units 11 may be configured to include an extending arm segment 1131' extending therefrom and connected to the armrest 133' of a corresponding one of the side rod units 13', i.e., the pivot seat 113' of each of the lateral frame units 11 is connected to the front and rear leg rods 111, 112 of the corresponding one of the lateral frame units 11 and the armrest 133' of a corresponding one of the side rod units 13'.

As shown in FIGS. 9 to 12, the third preferred embodiment of the tandem stroller frame 1" according to the present invention has a structure similar to that of the first preferred embodiment. The main difference between this embodiment and the first preferred embodiment resides in the configuration of the side rod units 13". In this embodiment, the armrest 133" of each of the side rod units 13" includes a front rod segment 1331 and a rear rod segment 1332. The front rod segment 1331 has a front end connected pivotally to the front leg rod 111 of the respective one of the lateral frame units 11, and a rear end opposite to the front end. The rear rod segment 1332 has a front end coupled pivotally to the rear end of the front rod segment 1331, and a rear end opposite to the front end and connected pivotally to the corresponding one of the side handle rods 121 of the handle unit 12. For each side rod unit 13", the front seat supporting rod 131" includes front and rear rod parts 1311, 1312 connected pivotally to each other, and the rear seat supporting rod 132" includes front and rear rod members 1321, 1322 connected pivotally to each other. The front rod part 1311 of the front seat supporting rod 131" has a front end portion configured as the front leg connecting portion that is connected pivotally to the front leg rod 111 of the respective one of the lateral frame units 11. The front rod member 1321 of the rear seat supporting rod 132" is generally L-shaped, and is connected pivotally to the rear rod part 1312 of the front seat supporting rod 131". The rear rod member 1322 of the rear seat supporting rod 132" has a front end portion connected pivotally to the front rod member 1321, and a rear end portion configured as the rear connecting portion that is connected pivotally to the rear leg rod 112 of the respective one of the lateral frame units 11. In this embodiment, the support arms 152 of the tray unit 15 extend respectively from lateral sides of the tray body 151. Each of the support arms 152 has a rear end connected pivotally to the front end portion of the front rod member 1321 of the rear seat supporting rods 132" of a respective one of the side rod units 13", and a front end connected pivotally to the front leg rod 111 of a respective one of the lateral frame units 11.

When the tandem stroller frame 1" is converted from the unfolded state (see FIG. 10) to the folded state (see FIG. 12), the side handle rods 121 of the handle unit 12 and the front leg rods 111 of the lateral frame units 11 are pivoted toward the rear leg rods 112 of the lateral frame units 11. Simultaneously, the rear rod segment 1332 of the armrest 133" of each of the side rod units 13" is pivoted relative to the front rod segment 1331 of the armrest 133" of the corresponding one of the side rod units 13", the front and rear rod parts 1311, 1312 of the front seat supporting rod 131" of each of the side rod units 13" are pivoted toward each other, and the tray unit 15 is pivoted toward the rear seat supporting rods 132" of the side rod units 13".

Figure 13:
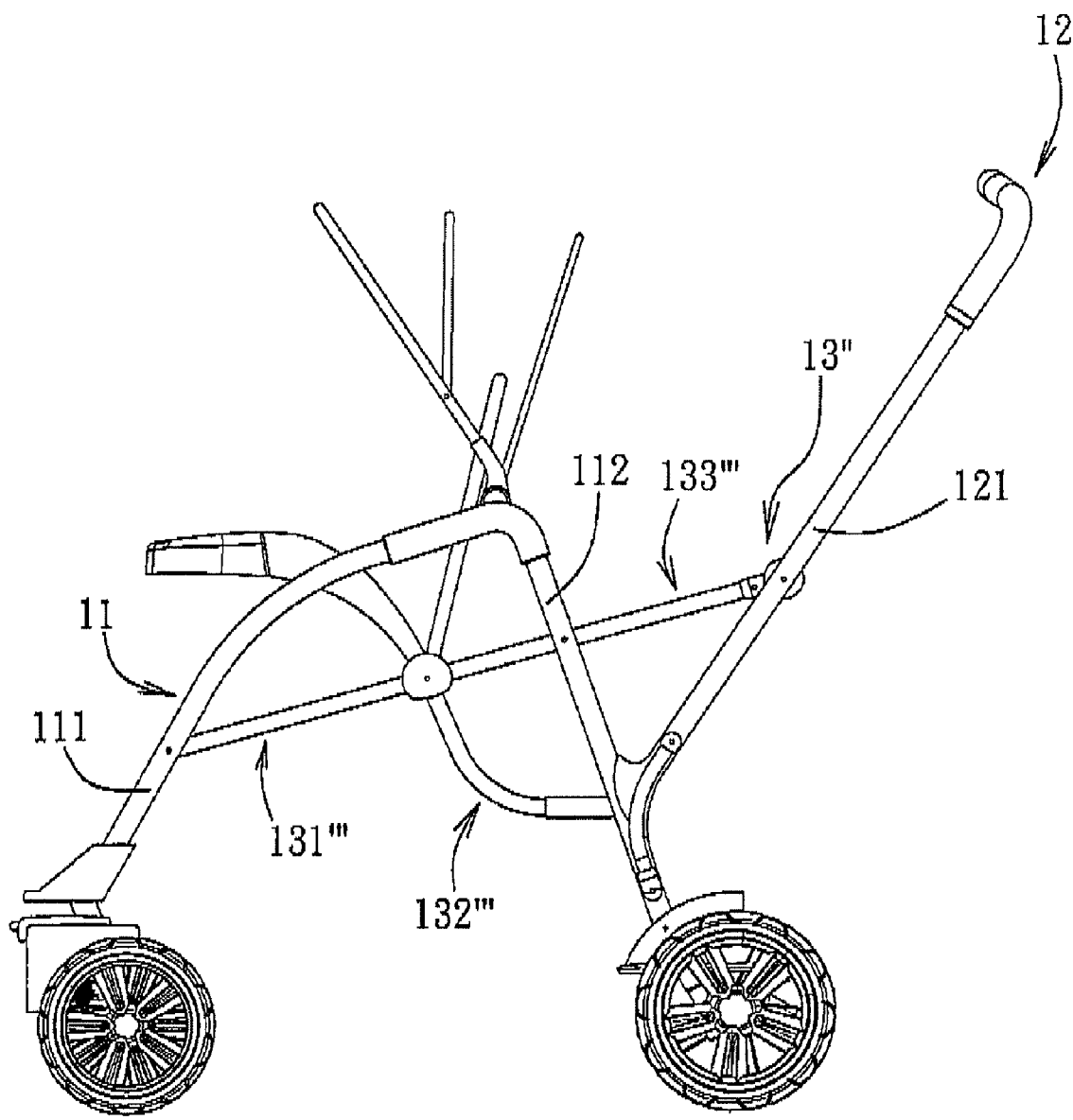
FIG. 13 is another side view of the third preferred embodiment with modified side rod units.

It should be further noted that, referring to FIG. 13, the side rod units 13" may be configured such that the front seat supporting rod 131''' of each of the side rod units 13" has the front end portion configured as the front leg connecting portion that is connected pivotally to the front leg rod 111 of the respective one of the lateral frame units 11, and the rear end portion connected pivotally to the armrest 133''' of the corresponding one of the side rod units 13", while the rear seat supporting rod 132''' of each of the side rod units 13" has the rear end portion configured as the rear connecting portion that is connected pivotally to the corresponding one of the rear leg rods 112. The armrest 133''' of each of the side rod units 13" has a rear end connected pivotally to the corresponding one of the side handle rods 121, and a front end opposite to the rear end and coupled pivotally to the front seat supporting rod 131''' of the corresponding one of the side rod units 13". In this embodiment, the support arms 152 of the tray unit 15 extend respectively from lateral sides of the tray body 151. Each of the support arms 152 has a rear end connected pivotally to the front end portion of the rear seat supporting rods 132''' of a respective one of the side rod units 13", and a front end connected pivotally to the front leg rod 111 of a respective one of the lateral frame units 11. Therefore, the armrest 133''' of each of the side rod units 13" is pivotable relative to the front seat supporting rod 131''' of the corresponding one of the side rod units 13" when the side handle rods 13" and the front leg rods 111 of the lateral frame units 11 are pivoted toward the rear leg rods 112 of the lateral frame units 11.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A tandem stroller frame comprising:
   a pair of spaced-apart lateral frame units, each of which includes a front leg rod and a rear leg rod connected pivotally to said front leg rod;
   a handle unit including a pair of side handle rods connected pivotally and respectively to said lateral frame units;
   a pair of side rod units, each of which is disposed between said front leg rod of a respective one of said lateral frame units and a corresponding one of said side handle rods of said handle unit, and includes
   a front leg connecting portion connected pivotally to said front leg rod of the respective one of said lateral frame units, and
   a rear connecting portion connected pivotally to one of the corresponding one of said side handle rods and said rear leg rod of the respective one of said lateral frame units,
   wherein said front leg connecting portions of said side rod units are adapted for supporting cooperatively a front seat thereon, and said rear connecting portions of said side rod units are adapted for supporting cooperatively a rear seat thereon; and
   a footrest plate interconnecting said rear leg rods of said lateral frame units and adapted to be disposed below the rear seat;

wherein each of said side rod units includes:
  a front seat supporting rod having a front end portion configured as said front leg connecting portion, and a rear end portion opposite to said front end portion;
  a rear seat supporting rod having a front end portion connected to said front seat supporting rod, and a rear end portion configured as said rear connecting portion; and
  an armrest disposed above said rear seat supporting rod, and having a front end connected pivotally to the respective one of said lateral frame units, and a rear end connected pivotally to the corresponding one of said side handle rods.

2. The tandem stroller frame as claimed in claim 1, wherein said rear end portion of said rear seat supporting rod of each of said side rod units is connected pivotally to the corresponding one of said side handle rods.

3. The tandem stroller frame as claimed in claim 1, wherein each of said lateral frame units further includes a pivot seat that interconnects pivotally said front and rear leg rods, said front end of said armrest of each of said lateral frame units being connected pivotally to said pivot seat of a corresponding one of said lateral frame units.

4. The tandem stroller frame as claimed in claim 1, wherein said front and rear seat supporting rods of each of said side rod units are formed integrally with each other.

5. The tandem stroller frame as claimed in claim 1, further comprising a tray unit including a tray body and a pair of support arms that extend from said tray body and that are connected pivotally and respectively to said front seat supporting rods of said side rod units.

6. The tandem stroller frame as claimed in claim 1, wherein said front end of said armrest of each of said side rod units is connected pivotally to said rear leg rod of the respective one of said lateral frame units.

7. The tandem stroller frame as claimed in claim 1, wherein said front end portion of said rear seat supporting rod of each of said side rod units is connected pivotally to said rear end portion of said front seat supporting rod of a corresponding one of said side rod units, and said rear end portion of said rear seat supporting rod of each of said side rod units is connected pivotally to said rear leg rod of the corresponding one of said lateral frame units.

8. The tandem stroller frame as claimed in claim 7, wherein said rear seat supporting rod of each of said side rod units includes a pair of rod members connected pivotally to each other.

9. The tandem stroller frame as claimed in claim 7, wherein said front seat supporting rod of each of said side rod units includes front and rear rod parts connected pivotally to each other.

10. The tandem stroller frame as claimed in claim 7, further comprising a tray unit including a tray body and a pair of support arms that extend from said tray body and that are connected pivotally and respectively to said rear seat supporting rods of said side rod units.

11. The tandem stroller frame as claimed in claim 1, further comprising a transverse rod having opposite ends connected respectively to said rear leg rods of said lateral frame units, said footrest plate having opposite ends connected respectively to said rear leg rods of said lateral frame units and being supported by said transverse rod.

12. The tandem stroller frame as claimed in claim 1, further comprising a transverse rod having opposite ends connected respectively to said rear leg rods of said lateral frame units, said footrest plate being mounted on said transverse rod.

13. A tandem stroller frame comprising:
  a pair of spaced-apart lateral frame units, each of which includes a front leg rod and a rear leg rod connected pivotally to said front leg rod;
  a handle unit including a pair of side handle rods connected pivotally and respectively to said lateral frame units;
  a pair of side rod units, each of which is disposed between said front leg rod of a respective one of said lateral frame units and a corresponding one of said side handle rods of said handle unit, and includes
    a front leg connecting portion connected pivotally to said front leg rod of the respective one of said lateral frame units, and
    a rear connecting portion connected pivotally to one of the corresponding one of said side handle rods and said rear leg rod of the respective one of said lateral frame units,
    wherein said front leg connecting portions of said side rod units are adapted for supporting cooperatively a front seat thereon, and said rear connecting portions of said side rod units are adapted for supporting cooperatively a rear seat thereon; and
  a footrest plate interconnecting said rear leg rods of said lateral frame units and adapted to be disposed below the rear seat;
  wherein each of said side rod units includes:
    a front seat supporting rod having a front end portion configured as said front leg connecting portion, and a rear end portion opposite to said front end portion;
    a rear seat supporting rod having a front end portion connected pivotally to said front leg rod of the respective one of said lateral frame units, and a rear end portion configured as said rear connecting portion that is connected pivotally to the corresponding one of said side handle rods; and
    an armrest disposed above said rear seat supporting rod, and having a front end connected to said rear end portion of said front seat supporting rod, and a rear end connected pivotally to the corresponding one of said side handle rods.

14. The tandem stroller frame as claimed in claim 13, wherein said front seat supporting rod and said armrest of each of said side rod units are formed integrally with each other.

15. The tandem stroller frame as claimed in claim 13, further comprising a tray unit including a tray body and a pair of support arms that extend from said tray body and that are connected pivotally and respectively to said front seat supporting rods of said side rod units.

16. A tandem stroller frame comprising:
  a pair of spaced-apart lateral frame units, each of which includes a front leg rod and a rear leg rod connected pivotally to said front leg rod;
  a handle unit including a pair of side handle rods connected pivotally and respectively to said lateral frame units;
  a pair of side rod units, each of which is disposed between said front leg rod of a respective one of said lateral frame units and a corresponding one of said side handle rods of said handle unit, and includes
    a front leg connecting portion connected pivotally to said front leg rod of the respective one of said lateral frame units, and
    a rear connecting portion connected pivotally to one of the corresponding one of said side handle rods and said rear leg rod of the respective one of said lateral frame units, wherein said front leg connecting portions of said side rod units are adapted for supporting cooperatively a front seat thereon, and said rear connecting portions of said side rod units are adapted for supporting cooperatively a rear seat thereon; and a footrest plate interconnecting said rear leg rods of said lateral frame units and adapted to be disposed below the rear seat;

wherein each of said lateral frame units further includes a pivot seat that interconnects pivotally said front and rear leg rods, said pivot seat of each of said lateral frame units including an extending arm segment that extends therefrom and that is connected to a corresponding one of said side rod units.

17. A tandem stroller frame comprising:

a pair of spaced-apart lateral frame units, each of which includes a front leg rod and a rear leg rod connected pivotally to said front leg rod;

a handle unit including a pair of side handle rods connected pivotally and respectively to said lateral frame units;

a pair of side rod units, each of which is disposed between said front leg rod of a respective one of said lateral frame units and a corresponding one of said side handle rods of said handle unit, and includes a front leg connecting portion connected pivotally to said front leg rod of the respective one of said lateral frame units, and a rear connecting portion connected pivotally to one of the corresponding one of said side handle rods and said rear leg rod of the respective one of said lateral frame units, wherein said front leg connecting portions of said side rod units are adapted for supporting cooperatively a front seat thereon, and said rear connecting portions of said side rod units are adapted for supporting cooperatively a rear seat thereon; and a footrest plate interconnecting said rear leg rods of said lateral frame units and adapted to be disposed below the rear seat;

wherein each of said side rod units includes:

a rear seat supporting rod having a front end portion and a rear end portion that is configured as said rear connecting portion and that is connected pivotally to said rear leg rod of the respective one of said lateral frame units; and a tray unit including a tray body and a pair of support arms that extend from said tray body, each of said support arms having a rear end that is connected pivotally to said front end portion of said rear seat supporting rods of a respective one of said side rod units, and a front end that is connected pivotally to said front leg rod of a respective one of said lateral frame units.

18. The tandem stroller frame as claimed in claim 17, wherein each of said side rod units further includes: a front seat supporting rod having a front end portion that is configured as said front leg connecting portion, and a rear end portion that is opposite to said front end portion and that is connected pivotally to said front end portion of said rear seat supporting rod of a corresponding one of said side rod units; and an armrest disposed above said rear seat supporting rod, and having a front end that is connected pivotally to said front leg rod of the corresponding one of said lateral frame units, and a rear end connected pivotally to the corresponding one of said side handle rods.

19. The tandem stroller frame as claimed in claim 17, wherein each of said side rod units further includes: a front seat supporting rod having a front end portion that is configured as said front leg connecting portion, and a rear end portion that is opposite to said front end portion; and an armrest disposed above said rear seat supporting rod, and having a front end connected pivotally to said rear end portion of said front seat supporting rod, and a rear end connected pivotally to the corresponding one of said side handle rods.

* * * * *